Aug. 7, 1951 N. L. DOLBEY 2,563,457
METHOD OF TREATING ASBESTOS FIBER
AND COATING SURFACES THEREWITH
Filed July 7, 1945 2 Sheets-Sheet 1
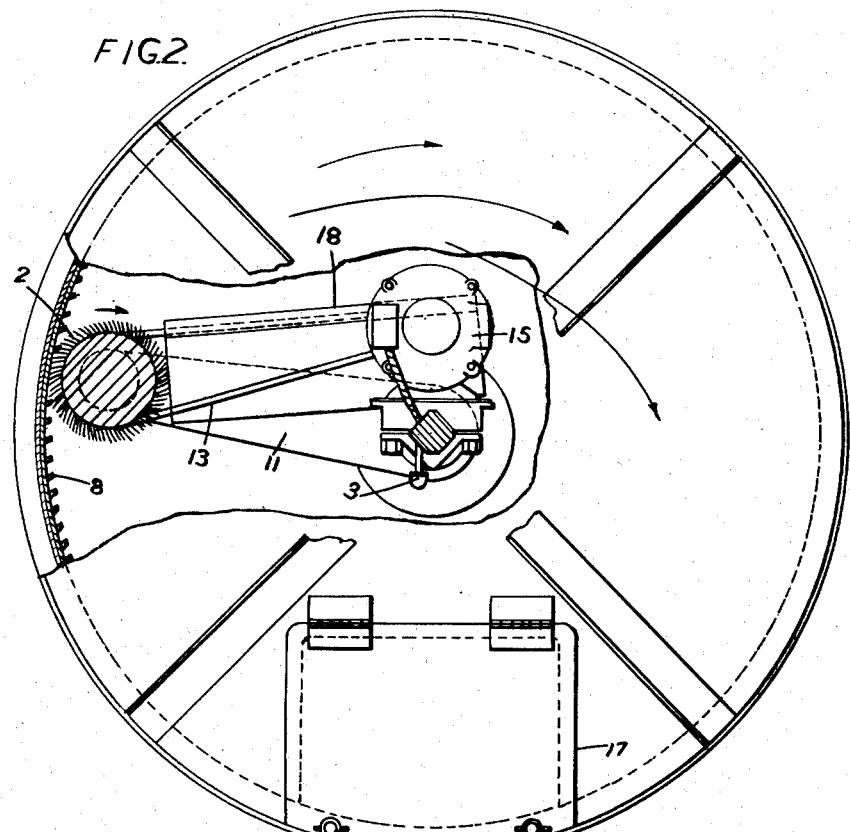
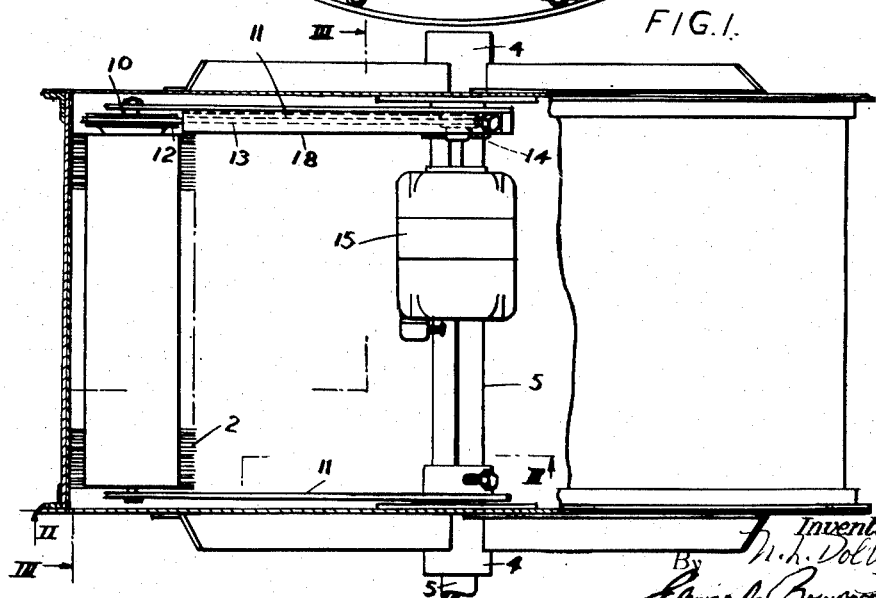

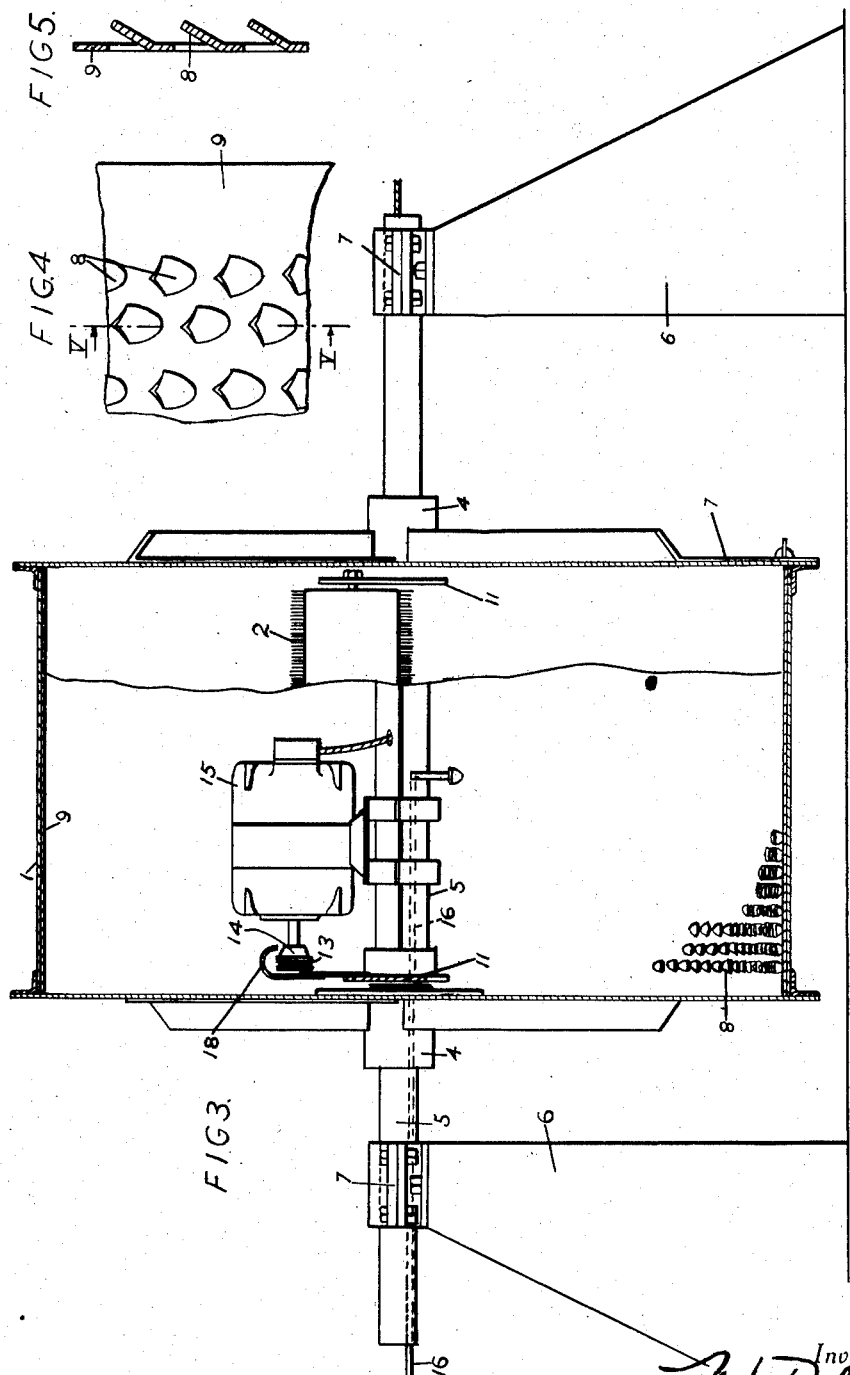

UNITED STATES PATENT OFFICE 2,563,457

METHOD OF TREATING ASBESTOS FIBER AND COATING SURFACES THEREWITH

Norman Louis Dolbey, Armley, Leeds, England

Application July 7, 1945, Serial No. 603,616
In Great Britain July 17, 1945

5 Claims. (Cl. 117—27)

Coatings useful for heat-insulating, fire-resisting, acoustic and similar purposes can be produced by spraying asbestos fibre with or without other materials and with an adhesive (or ingredients which react to form an adhesive), onto the surface to be coated so as to form a cellular structure containing a large number of air cells. The method and general form of apparatus described in my Patents Nos. 1,990,584 and 1,990,585 have proved very effective for this purpose and are extensively used. In principle, this method involves the suspension of the asebstos in air and the spraying of the suspension with a simultaneous liquid spray. The apparatus described in my said patents include a fan and the blades of this serve not only to propel a preformed suspension forwards but also to beat and open up any fibre bundles present in the suspension. The result is that dust is released and becomes suspended with the asbestos. It is impossible to trap this dust, with the further result that some of it escapes into the surrounding atmosphere during the spraying operation, and the operators have to wear masks.

Many attempts have been made to remove this drawback, including proposals to damp the fibres, but none has been successful and the problem is outstanding. In various attempts that I myself made to eliminate dust by damping the fibres I found at first that the fibres always tended to coalesce into clots, which had a deleterious effect in that they produced irregular sprayed coatings. Moreover, even though considerable quantities of water were used, much dust was still produced during the spraying. In addition the clots tended to adhere to the internal parts of the spraying apparatus and materially interfered with the operation.

In the course of further prolonged researches I have discovered that it is possible to eliminate or at least materially to reduce the amount of dust by means of water or other damped material and yet to produce satisfactory coatings. If the material is too wet the coating is not satisfactory, so the amount of water must be limited. My researches show that the primary cause of the failures hitherto has been uneven distribution of a limited amount of moisture over the surfaces of fibre bundles, causing these to agglomerate into clots with pockets of dust trapped at the centre. This dust is later released into the atmosphere during the spraying operation. This tendency is apparently due to the high absorptive or adsorptive property of the fibre, which is capable of holding water in excess of that required to eliminate dust before it will allow a further quantity of water to pass to the fibre inside the clots, so that water in excess of that permitting satisfactory spraying must be added if the natural affinity of the fibre for water is permitted to be the only deciding factor.

I have further found that if the fibre which is sprayed contains any dry particles dust will be produced during the spraying and will not be damped in the spraying. On the other hand non-uniform wetting is essential to make the fibres stick to one another and to the surface to be coated directly they strike it. In short, the irregular distribution of moisture which is an essential feature of the sprayed coating is a direct cause of dust formation if water is added in haphazard fashion to the asbestos with the object of damping the dust.

As an illustration, I attempted to eliminate dust by using a conveyor to carry finely subdivided asbestos as a thin layer beneath a damping spray of water supplied in an amount proportionate to the asbestos, all my previous work on asbestos fibre having led me to suppose that this would result in uniform damping. However, when I subsequently suspended the asbestos in air and sprayed it, the amount of dust was substantially the same as if no water had been added at all.

I have now found that I can achieve the desired result by mixing the asbestos with a predetermined quantity of water or other damping material in such a way that in the course of the mixing substantially every particle of asbestos is damped and the damping material is uniformly distributed throughout the abestos. When I have uniformly damped all the particles I suspend the damped asbestos in air and spray the suspension.

Asbestos as it exists in nature consists of bundles of fibre adherent together and the process commonly known as coarsely opening the asbestos essentially involves the separation of these bundles from one another. In fully opened fibre, such as that which is commonly sprayed at the present time, most of the natural fibre bundles are broken up but the asbestos is not reduced to its ultimate fibres; rather this fully opened fibre consists essentially of small fibre bundles each containing, say, three or four ultimate fibres. By "particle" I mean each separate piece of asbestos, whether that is an ultimate fibre, a small fibre bundle or a fibre bundle of the size found in coarsely opened asbestos. Since there may be dust inside these latter fibre bundles it is necessary to force the damping material into the insides of the bundles, and I prefer to open them into smaller bundles before or during the mixing.

By uniformly damping every particle I prevent clotting and the trapping of dust which would otherwise occur since my observations show that if the particles differ in their moisture content the dryer particles will cling to the wetter particles, apparently by reason of capillary action. Some of my unsuccessful attempts in the past were undoubtedly caused by failure to make each particle take up the same amount of moisture as the others.

I prefer to add the requisite amount of water (or other damping material) roughly, and to mix the mass of fibres so thoroughly together in a mixing machine as to give even distribution of moisture throughout the mass. Various kinds of mixing machines may be used, but I prefer to use one of such a nature that during the mixing the fibre becomes (or is maintained) finely sub-divided and is not transformed into hard lumps. When a mechanical mixer is used the water or the like may be added while the mixer is in operation or the asbestos may first be spread out on a flat surface and wetted with the necessary quantity of water and then be passed through the mixing machine to ensure that all the individual particles are damped and that the moisture is uniformly distributed.

The mixing may itself release some dust into the surrounding atmosphere; this may happen if the asbestos is suspended in air or opened during the mixing process. In such a case the damped asbestos must not be directly passed to the spraying apparatus without taking steps to eliminate the dust released during the mixing. This may be done, for instance, by allowing the damped asbestos to remain as a mass for long enough for any dust released by reason of the suspension or opening to settle on and adhere to the damped particles. Again, if the dust is released in an enclosed space, e. g. a mixing drum, the mass of damped asbestos may be immediately removed at the end of the mixing process provided that the suspended dust is not removed with it.

The preferred form of mixing apparatus incorporates a rotary mixing drum adapted to carry the asbestos upwards as the drum rotates and a rotary brush mounted within the drum to engage the asbestos which is carried upwards and by a beating action to open up fibre bundles and fling the particles forwards through the drum to fall to the bottom and be carried upwards again. In operation there is always a mass of asbestos in the bottom of the drum and so long as the damping is not uniform the drier particles in this will tend to adhere to the wetter particles. Fibre bundles are thus formed and continually carried to the brush which opens them and by flinging them back to the mass through the air brings about the mixing which leads to uniformity of damping. As the operation proceeds the damping becomes more and more uniform and the tendency to form bundles correspondingly decreases.

One machine of this kind is shown in the accompanying drawings in which:

Figure 1 is a plan of the apparatus and is partly in section;

Figure 2 is a section on the line II—II in Figure 1;

Figure 3 is an elevation, partly in section, on the line III—III in Figure 4;

Figure 4 is an enlarged view of part of the inner surface of the drum; and

Figure 5 is a section on the line V—V in Figure 4.

The apparatus shown comprises a rotary drum 1 in which the asbestos is placed and which contains a rotary brush 2. The drum 1 is carried by bearings 4 on a fixed hollow shaft 5 which is circular in section outside the drum and square in section inside the drum and which is clamped in pedestals 6 in the clamps 7.

The brush 2 is fixed to a shaft 10 which is carried in bearings in the ends of radial arms 11 which are fixed to the square part of the shaft 5. The shaft 10 also carries a pulley 12 engaged by a belt 13 which also passes round a pulley 14 mounted on the shaft of an electric motor 15. This motor is also secured to the square part of the shaft 5 and the leads to it pass through the shaft. The motor 15 thus drives the brush, which is so placed that its bristles come into contact with the inner surface of the drum and in so doing exert on the drum a continuous torque which causes it to rotate. The drive thus transmitted is, of course, not positive, and the linear speed of the tips of the bristles is greater than that of the inner surface of the drum. This difference in linear speed is important, as the bristles must tear into the fibre carried upwards by the drum and fling it forwards as particles so that it passes through the drum as indicated by the arrows in Figure 2 and falls to the bottom again.

The drum is furnished with a lining 9, parts of which are bent inwards to form tongues or the like 8. These engage the mass of asbestos in the bottom of the drum and carry it upwards, and they also cooperate with the brush 2 in opening fibre bundles formed by uneven distribution of moisture. In effect the tongues provide a number of pockets with sharp edges, and as the bristles sweep by these the asbestos is torn out of them and the fibre bundles are opened by the tearing action both of the bristles and of the more slowly moving edges of the pockets.

The drum also contains a water spray nozzle 3 fed by a pipe 16 which also runs through the shaft 5. In operation the asbestos is introduced through a charging door 17 and the drum is then rotated, the water being introduced during the rotation, which is continued for long enough for the intimate mixing necessary to ensure uniform moistening to take place. It will be understood that the dimensions and speeds of the drum and brush may vary considerably, and to ensure a sufficient difference in linear speed it may even be necessary to retard the drum by an appropriate brake. As an example, the drum may be 3 feet in diameter, the brush may be driven at a high speed, say 100 R. P. M., and in consequence may drive the drum at 20 R. P. M., and the mixing may continue for three minutes, that is to say, for 60 revolutions of the drum. At the end of the mixing the moist asbestos is removed through the door 17.

Since the action of the brush on the asbestos may produce some dust it may be desirable to let the asbestos stay in the drum for a little time after the rotation has stopped in order that any such dust may settle and be moistened by contact with damp particles.

The angular position of the brush in the drum may be adjusted by turning the shaft 5 in the clamps 7.

A guard 18 is provided over the belt 13 and pulleys 12 and 14 to prevent them from being clogged by asbestos.

As an example of another method of mechanical mixing, water may be forced into the asbestos by pressure to effect nearly uniform damping and then the uniform distribution of the damping material may be completed in a second stage. For instance the predetermined amount of water may be added to naturally occurring asbestos in a machine such as a mortar mill, where the water and fibre are squeezed together under rollers for a period, whilst at the same time scraper blades of the equivalent work on the fibre to turn it over and over. This first stage of the damping process consolidates rather than opens up the asbestos, and the asbestos is mechanically opened in a second stage in which the further contact of the particles with one another ensures that they all become uniformly damp.

Another way of carrying out the invention is to project a suspension of the asbestos and a finely divided stream of the damping material, e. g. a spray of atomised water or steam, through the air so that they travel together. The streams of asbestos and damping material should either emerge from concentric orifices or be directed at only a small angle to one another so that they will travel together as long as possible. If the initial velocities of the two streams are the same the damping material will move faster through the air than the asbestos and provided that the damping material is sufficiently finely divided all the asbestos particles will be damped in the air. Naturally it is essential that the asbestos is projected through the air at a uniform rate and that the water or other damping material is projected at a proportional rate. The asbestos may be fed to a fan by an apparatus resembling that shown in my said patents in order to suspend and project it uniformly. In any such method in which damping is effected by spraying the suspended fibre should be allowed to settle before it is again suspended for spraying, because dust actually present in the air during the damping, that is to say, released during the first suspension, will not be damped and must be allower to settle and to adhere to fibre that has been moistened. Alternatively the dust may be removed from the damped asbestos in a cyclone separator or the like.

As indicated above, the quantity of the water or the like to be used is predetermined. The minimum quantity is determined by the necessity for coating substantially every particle of asbestos fibre and depends on the variety of the asbestos and its degree of sub-division, on which depends the amount of surface available for wetting. Very considerable reduction in the amount of dust is produced in most fibres by the addition of water equal to 2 or 3% of the asbestos fibre by weight, but we prefer to add a minimum of 5%. When the asbestos is crocidolite blue asbestos that is coarsely opened, that is to say, contains bundles of fibre in the state in which they are found in nature, 3% is the minimum to be added if dust is to be substantially eliminated. However, with the fibre in question the addition of only 2% water leads to some reduction in the amount of dust, a reduction, that is to say, that is great enough to represent a real advance over the existing processes. When the same fibre is fully opened, that is to say, has most of the fibres separated from one another as is the case in the asbestos that is commonly sprayed at the present time, the equivalent figures are higher, say 5% and 4% respectively.

As an example, the drum 1 shown in the drawings may be used for treating batches of asbestos, each some 6 or 7 lbs. in weight, and water equal in weight to 7% of the asbestos may be introduced as a fine spray through the nozzle 3.

An upper limit is imposed on the amount of water that may be used by the fact that the whole fibrous mass must be dry enough to form a cellular coating when it is sprayed, i. e. the moisture must be retained on the surface of the individual fibres and must not fill the spaces between the fibres. It appears that it is adsorption of the moisture on the surface of the asbestos fibre that leads to success, and that the fibres can then adsorb relatively large quantities of moisture, i. e. up to 40% or even more of their own weight, in the case of crocidolite blue asbestos. What must be avoided is any free liquid such as could be squeezed out of the mass by applying pressure to it. With white asbestos fibres, which when damped tend to collapse in the spray coating more readily than blue asbestos fibres, it may not be possible to use the maximum quantity of water than can be adsorbed on the surface.

Instead of directly adding the water or other damping material to the fibre, it may be used to wet another material which is then mixed with the fibre; that other material may itself be fibre or may be sawdust, paper pulp or any other material capable of taking up moisture and giving it up again to the fibre to be damped. As an example, 20 parts of wet fibre containing half its weight of water can be mixed with 90 parts of dry fibre to give 100 parts of fibre and 10 parts of water.

If desired, a wetting agent may be used to facilitate the damping. Thus a small proportion of a powdered wetting agent, say 0.1% by weight of the fibre, may be mixed with the fibre or a soluble wetting agent may be dissolved in the water. The use of a wetting agent enables each particle to be coated by a smaller amount of water and so reduces the amount of water used.

Yet another way of effecting the intimate mixing comprises evenly distributing a hygroscopic material throughout the asbestos, exposing the mixture to a moist atmosphere and holding the mixture as a mass for long enough before it is suspended in air to allow the damping to take place by transfer of moisture from the hygroscopic material to the asbestos. The hygroscopic material, which may be in powdered or liquid form, must not only be uniformly distributed throughout the asbestos but it must take up the moisture substantially uniformly. To enable it to do this, the mixture may be spread out as a layer in a moist atmosphere, or in humid air it may be enough simply to open up a preformed and packed mixture of hygroscopic material and fibre, say by breaking up the lumps of fibre by hand. The period during which the mixture is held to allow the transfer of moisture from the hygroscopic material to the asbestos may be very short in a humid atmosphere. I prefer to use powdered calcium chloride as the hygroscopic material. Glycerine is an example of a suitable liquid hygroscopic material.

When a hygroscopic material is used it is the amount of it which primarily determines the amount of moisture taken up by the asbestos and I find that as a general rule an amount of calcium chloride powder equal to 2% by weight of the asbestos fibre is enough to reduce the dust materially, but we prefer to use about 5%. As the calcium chloride must be evenly distributed throughout the fibre it must be used as a fine dry powder and if the fibre is then to be packed and stored or transported before use the mixing and packing must be effected rapidly to prevent the formation of clots of fibre by moisture taken up by the calcium chloride at this stage.

Of course, if admixtures of asbestos and other solids, e. g. cement, are sprayed together, some of the water or the like may be withdrawn from the asbestos by the additional solid, and allowance for this must be made in determining the minimum quantity of water or hygroscopic material. Further, if the coating is to be formed by spraying cement and water with the fibre and the cement is mixed with the fibre before the spraying, we find that the mixture must be sprayed before the fibre tends in turn to give up moisture to the cement, with the result that dust is once more produced during the spraying. The period of time involved depends upon the speed with which the cement reacts with water, and a peirod of two or three days may elapse before there are any adverse effects. When the damping is effected by transfer of moisture from a hygroscopic material, the presence of cement in the moisture affects the amount of calcium chloride or other hygroscopic material required and the minimum time of exposure to the moist atmosphere, both being increased. For example, if the mixture contains Portland cement in an amount equal to 50% by weight of the fibre, the best results so far as dust reduction alone is concerned may be obtained with an amount of calcium chloride equal to about 7% by weight of the total mixture and exposure to a moist atmosphere for about 30 minutes. A lower amount of calcium chloride may be necessary if no calcium chloride may be left uncombined with the cement in the coating.

Finally if other mineral fibre is mixed with the asbestos, the difference in the adsorptive capacity of the fibres must be taken into account in determining the quantity of water, other damping material or hygroscopic material used.

One advantage obtained by the invention is that the moisture tends to lubricate the fibre and so to avoid further disintegration during the spraying process, which might in itself lead to the creation of more dust.

I claim:

1. A method of applying a cellular coating of asbestos fibers and a binding agent to a surface without release of dust from said fibers comprising providing opened asbestos as a mass of asbestos fibers and bundles thereof, distributing uniformly through said opened asbestos moisture in limited amount from 3% to not over 40% of the weight of said asbestos to damp evenly the surfaces of the fibers and cause dust to cling to said fibers but not so great that there is free liquid which can be expelled by pressure, thereafter suspending said damped fibers dispersed into a stream of air and conveying said fibers in said stream to said surface and adding to said damped fibers as they impinge on said surface additional unevenly distributed moisture by a simultaneous liquid spray to cause said fibers to cling to one another and to said surface in a cellular coating, said fibers having said binding agent added to them subsequent to the initial dampening treatment for simultaneous deposit of said agent and said fibers on said surface.

2. A method of applying a cellular coating of asbestos fibers and a binding agent to a surface without release of dust from said fibers comprising providing opened asbestos as a mass of asbestos fibers and bundles thereof, dispersing together in air the fibers of opened asbestos and an amount of moisture between 3% and 40% of the weight of said asbestos, permitting said fibers and said moisture to settle and said moisture to be uniformly distributed through said fibers in said limited amount evenly to damp the surfaces of the fibers and cause dust to cling thereto, thereafter suspending said damped fibers dispersed into a stream of air and conveying said fibers in said stream to said surface and adding to said damped fibers as they impinge on said surface additional unevenly distributed moisture by a simultaneous liquid spray to cause said fibers to cling to one another and to said surface in a cellular coating, said fibers having said binding agent added to them subsequent to the initial dampening treatment for simultaneous deposit of said agent and said fibers on said surface.

3. A method of applying a cellular coating of asbestos fibers and a binding agent to a surface, without the release of dust present among said fibers, comprising the steps of forming a uniform mixture of opened asbestos and a hygroscopic material, exposing said mixture to a moist atmosphere to absorb moisture amounting to between 3% and 40% of the weight of said mixture to damp evenly the asbestos fibers therein and cause dust to cling to said fibers, thereafter dispersing said fibers into a stream of air, conveying said fibers in said stream to said surface and adding to said fibers as they impinge on said surface additional unevenly distributed moisture by a simultaneous liquid spray to cause said fibers to cling to one another and to said surface in a cellular coating, said fibers having said binding agent added to them subsequent to the said absorption of moisture for simultaneous deposit of said agent and said fibers on said surface.

4. A method as claimed in claim 3 wherein said hygroscopic material is calcium chloride amounting to between 2% and 5% of the weight of said asbestos.

5. A method of applying a cellular coating of asbestos fibers and a binding agent to a surface, without the release of dust present among said fibers, comprising the steps of forming a uniform mixture of opened asbestos and a material damped with moisture to damp evenly the fibers thereof with moisture amounting to between 3% and 40% of the weight of said asbestos and cause dust to cling to said fibers, thereafter dispersing said fibers into a stream of air, conveying said fibers in said stream to said surface and adding to said fibers as they impinge on said surface additional unevenly distributed moisture by a simultaneous liquid spray to cause said fibers to cling to one another and to said surface in a cellular coating, said fibers having said binding agent added to them subsequent to the initial dampening treatment for simultaneous deposit of said agent and said fibers on said surface.

NORMAN LOUIS DOLBEY.

REFERENCES CITED

The following references are of record in the file of this patent:

UNITED STATES PATENTS

| Number | Name | Date |
|---|---|---|
| Re. 12,778 | Bonvillain | Apr. 7, 1908 |
| 1,365,878 | Weiss | Jan. 18, 1921 |
| 1,692,996 | Richardson | Nov. 27, 1928 |
| 1,786,669 | Manning | Dec. 30, 1930 |
| 1,805,632 | Milar | May 19, 1931 |
| 1,978,125 | Bennett | Oct. 23, 1934 |
| 1,990,585 | Dolbey | Feb. 12, 1935 |
| 2,022,750 | Tookey | Dec. 3, 1935 |
| 2,152,901 | Manning | Apr. 4, 1939 |
| 2,233,433 | Smith | Mar. 4, 1941 |
| 2,276,487 | Harshberger | Mar. 17, 1942 |

FOREIGN PATENTS

| Number | Country | Date |
|---|---|---|
| 388,924 | Great Britain | Mar. 9, 1933 |
| 439,476 | Great Britain | Dec. 6, 1935 |